US008341251B2

(12) United States Patent
Gao et al.

(10) Patent No.: US 8,341,251 B2
(45) Date of Patent: Dec. 25, 2012

(54) ENABLING STORAGE AREA NETWORK COMPONENT MIGRATION

(75) Inventors: Zhaohui Gao, West Linn, OR (US); Larry Steven McGimsey, Mead, CO (US); Ronald Earl Van Buskirk, II, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 11/968,866

(22) Filed: Jan. 3, 2008

(65) Prior Publication Data
US 2009/0177878 A1 Jul. 9, 2009

(51) Int. Cl.
*G06F 15/177* (2006.01)
(52) U.S. Cl. ................................... 709/222; 709/220
(58) Field of Classification Search .................. 709/221
See application file for complete search history.

(56) References Cited

U.S. PATENT DOCUMENTS

| | | | |
|---|---|---|---|
| 5,680,640 A | 10/1997 | Ofek et al. | |
| 6,606,690 B2 | 8/2003 | Padovano | |
| 6,654,830 B1 * | 11/2003 | Taylor et al. | 710/74 |
| 6,804,718 B1 | 10/2004 | Pang et al. | |
| 6,950,917 B2 | 9/2005 | Nagasawa et al. | |
| 6,976,103 B1 * | 12/2005 | Watanabe et al. | 710/74 |
| 7,085,883 B1 | 8/2006 | Dalgic et al. | |
| 7,600,092 B2 * | 10/2009 | Yamamoto et al. | 711/170 |
| 7,606,889 B1 * | 10/2009 | Kundala et al. | 709/223 |
| 7,934,018 B1 * | 4/2011 | Lavallee et al. | 709/248 |
| 2004/0059813 A1 * | 3/2004 | Bolder et al. | 709/224 |
| 2004/0133610 A1 * | 7/2004 | Flam et al. | 707/200 |
| 2005/0144414 A1 * | 6/2005 | Yamamoto et al. | 711/170 |
| 2006/0143332 A1 | 6/2006 | Yagi et al. | |
| 2008/0021883 A1 * | 1/2008 | Alstrin et al. | 707/3 |
| 2008/0126773 A1 * | 5/2008 | Martinez et al. | 713/1 |

* cited by examiner

*Primary Examiner* — Scott Christensen
(74) *Attorney, Agent, or Firm* — Francis Lammes; Stephen J. Walder, Jr.; Matthew C. Zehrer

(57) ABSTRACT

Enabling storage area network (SAN) component migration are provided. An end-to-end systems management console, referred to as the hardware migration assistant, is provided to simplify the migration steps for a SAN administrator to replace key SAN components. The hardware migration assistant provides a single interface suitable for stepping the SAN administrator through the reconfiguring task faster and with fewer sources of error than the known distributed manual process. The hardware migration assistant of the illustrative embodiments provides an interface through which a user may specify a type of SAN component that is being replaced and identifies the particular SAN components that are being replaced. The hardware migration assistant provides a knowledge base for guiding the user through the replacement operation and the reconfiguring of the SAN components, including the new SAN components, based on the previous configuration of the replaced components.

23 Claims, 6 Drawing Sheets

| Select configuration items to migrate: | | |
|---|---|---|
| | OLD COMPONENT | NEW COMPONENT |
| ☐ | Port Speed:<br>4GB/s    510 | Port Speed:<br>4GB/s    520 |
| 530 — ☐ | Zone Map:<br>Port 1 : Port 5 | Zone Map:<br>Port 1 : Port 5 |
| ☒ | Port 2 : Port 7 | Port 2 : Port 6 |
| ☐ | Port 3 : Port 6 | Port 3 : Port 9 |
| | Port 4 : Port 8 | Port 4 : Port 8 |
| ☐ | SNMP:<br>SNMP Community String:<br>(MY_SWITCH_1213)<br>... | SNMP:<br>SNMP Community String:<br>(MY_SWITCH_1213)<br>... |
| | Replicate/Migrate — 535    Set Config. — 540 | |

*FIG. 5A*

| Select Conflict/Error for Which Troubleshooting Help is Desired: — 550 | |
|---|---|
| Conflicts/Errors: | Solution: |
| ☒ Unable to See Host. | Solution 1 - Check to See if Host is Physically... |
| ☐ Unable to See Storage Subsystem. | Solution 2 - Check to See if... |
| ☐ Switch Not Detected.<br>...    560 | Solution 3 - Check Zone Mappings Between Port...<br>...    570 |
| | |

ENABLING STORAGE AREA NETWORK COMPONENT MIGRATION

BACKGROUND

1. Technical Field

The present application relates generally to an improved data processing system and method. More specifically, the present application is directed to a system and method for enabling storage area network (SAN) component migration.

2. Description of Related Art

A storage area network (SAN) is an architecture to attach remote computer storage devices (such as disk arrays, tape libraries and optical jukeboxes) to servers in such a way that, to the operating system, the devices appear as locally attached. Modern SANs are very complex having many different components with complex dependencies between the storage subsystems, switches, directors, and host systems. A change to any one of these components without the appropriate configuration within the SAN can "break" the SAN causing a business or organization's computer system to become partially or even wholly inoperable.

Thus, whenever a SAN administrator needs to replace a component of the SAN, e.g. a host bus adapter (HBA), switch, directory, storage subsystem, or the like, they must proceed carefully. Typically, the SAN administrator must manually reconfigure the SAN to utilize the new replacement component, which may not be able to use the same configuration as the component that it is replacing. To reconfigure the SAN, the SAN administrator must use multiple user interfaces with multiple manual steps, keep track of and enter many different component identifier numbers in various places to achieve the required configuration, configure ports, mappings, zones, etc., in order to achieve a desired result. Thus, there are many possible sources of error.

Moreover, the complexity is increased by the fact that SANs are typically compartmentalized such that the same SAN administrator is not responsible for all of the components of the SAN and may not even have authority to modify the configuration of all components of a SAN. For example, one SAN administrator or team may be responsible for the configuration of host systems of the SAN, another SAN administrator or team may be responsible for the switch and data communication infrastructure, and still a third SAN administrator or team may be responsible for configuring the storage subsystems. Thus, in order for a component to be replaced, coordination of these various SAN administrators or teams must be maintained such that each does the necessary work at the correct time to cause the SAN to be reconfigured to obtain the desired result.

These SAN administrators or teams typically must wait for a maintenance window, work in teams, and spend a great deal of time verifying their work. While this method of SAN reconfiguration in response to a replacement of a component works, it can be very expensive with regard to SAN administration labor costs and time. For example, if a particular business has their SAN equipment on a 3 year lease, they could be replacing ⅓ of their storage resources every year and spending thousands of dollars in labor costs to perform the replacement and reconfiguration.

SUMMARY

The illustrative embodiments provide a system and method for enabling storage area network (SAN) component migration. The illustrative embodiments provide an end-to-end systems management console, referred to as the hardware migration assistant, to simplify the migration steps for a SAN administrator to replace key SAN components. The hardware migration assistant provides a single interface suitable for stepping the SAN administrator through the reconfiguring task faster and with fewer sources of error than the known distributed manual process.

The hardware migration assistant of the illustrative embodiments works in concert with a SAN topology management system, such as IBM TotalStorage Productivity Center™ or IBM Systems Director™. The SAN topology management system maintains information regarding the various SAN components of the SAN fabric and their configurations. The hardware migration assistant of the illustrative embodiments provides an interface through which a user may specify a type of SAN component that is being replaced and identifies the particular SAN components that are being replaced. The hardware migration assistant provides a knowledge base for guiding the user through the replacement operation and the reconfiguring of the SAN components, including the new SAN components, based on the previous configuration of the replaced components. In order to provide such guidance, a snapshot of the internal configuration of the replaced SAN component is obtained prior to replacement and used as a basis for determining a manner by which to configure the new SAN component. Based on the old configuration and the type of new SAN component being used to replace the old SAN component, the knowledge base provides the user with a detailed explanation of how to incorporate the new SAN component(s) in the existing SAN fabric such that the SAN does not "break."

The hardware migration assistant may run a probe on the new SAN component to detect its default or user defined configuration as well as determine the microcode level of the new SAN component. If the microcode level, e.g. firmware version, etc., is different from other similar SAN components in the SAN fabric, this may be flagged for prompting the user to correct the difference in microcode level. Alternatively, the hardware migration assistant may initiate an automated update of the microcode level to a required level to make it consistent with other existing SAN components in the SAN fabric, or automatic updating of the other existing SAN components in the SAN fabric to the microcode level of the new SAN component.

In addition, the hardware migration assistant may provide a side-by-side comparison of the old SAN component's configuration with the new SAN component's configuration in order to highlight differences. User interface elements may be provided for aiding the user in replicating the old configuration to the new SAN component for each configuration item individually.

Troubleshooting aids may also be provided through the hardware migration assistant of the illustrative embodiments. These troubleshooting aids may be general in nature and directed to particular problems that may typically be encountered with the replacement and configuring of the particular type of SAN component. Alternatively, mechanisms may be provided for verifying the new configuration of the new SAN component and determining specific errors associated with this new configuration. Troubleshooting aids for the detected configuration error may be automatically identified and then presented to the user to aid the user in correcting the configuration of the new SAN component based on the specific error encountered.

In one illustrative embodiment, a computer program product comprising a computer useable medium having a computer readable program is provided. The computer readable program, when executed on a computing device, causes the computing device to perform various ones, and combinations of, the following operations: (1) perform a snapshot of a current configuration of an old SAN component that is to be replaced, retrieve configuration rules for configuring a new SAN component for replacement of the old SAN component based on an identification of the old SAN component and the new SAN component; (2) present guidance to a user for replacing the old SAN component with the new SAN component based on the retrieved configuration rules; (3) obtain an initial configuration of the new SAN component; (4) present a comparison of the snapshot of the current configuration of the old SAN component with the initial configuration of the new SAN component; and (5) re-configure the new SAN component based on the presented comparison.

The computer readable program may further cause the computing device to receive a replacement request indentifying a SAN component type for a SAN component that is to be replaced and identify one or more existing SAN components in a SAN topology having a type matching the SAN component type in the replacement request. The computer readable program may also cause the computing device to present a listing of the one or more existing SAN components in the SAN topology to user and receive a user selection of the old SAN component from the presented listing. The computer readable program may cause the computing device to obtain an initial configuration of the new SAN component by running a probe on the new SAN component following discovery of the new SAN component within a SAN topology.

The comparison may be a side-by-side interface representing the old SAN component in a first portion of the side-by-side interface and representing the new SAN component in a second portion of the side-by-side interface. Differences in configuration of the old SAN component and configuration of the new SAN component may be accentuated in the first portion and second portion of the side-by-side interface.

Moreover, the computer readable program may further cause the computing device to provide one or more user interface items within the side-by-side interface for migrating one or more configuration items from the configuration of the old SAN component to the configuration of the new SAN component. Furthermore, the computer readable program may cause the computing device to re-configure the new SAN component in response to a user selection of one of the one or more user interface items.

The computer readable program may further cause the computing device to verify a new configuration of the re-configured new SAN component and provide a troubleshooting aid to the user in response to a determination that at least one configuration item in the new configuration is not verified. The computer readable program may cause the computing device to retrieve configuration rules for configuring a new SAN component for replacement of the old SAN component based on an identification of the old SAN component and the new SAN component by: (1) identifying at least one general configuration rule for configuring the new SAN component for replacement of the old SAN component; (2) identifying at least one internal mapping module having specific configuration rules for at least one of the new SAN component or the old SAN component; and (3) applying the at least one general configuration rule and the specific configuration rules of the at least one internal mapping module to the new SAN component.

The computer readable program may comprise instructions that are stored in a computer readable storage medium in a data processing system. The instructions may have been downloaded over a network from a remote data processing system. Moreover, the computer readable program may comprise instructions that are stored in a computer readable storage medium in a server data processing system. The instructions may be downloaded over a network to a remote data processing system for use in a computer readable storage medium with the remote data processing system.

In another illustrative embodiment, a method for providing a hardware migration service for replacing a storage area network (SAN) component is provided. The method may comprise performing various ones, and combinations of, the operations outlined above with regard to the computer program product embodiment.

In yet another illustrative embodiment, a system for providing a hardware migration service for replacing a storage area network (SAN) component is provided. The system may comprise at least one processor and a memory coupled to the at least one processor. The memory may comprise instructions which, when executed by the at least one processor, cause the processor to perform various ones, and combinations of, the operations outlined above with regard to the computer program product embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide a system and method for enabling storage area network (SAN) component migration. As such, the illustrative embodiments are especially well suited for implementation in a distributed data processing environment that comprises a SAN. Accordingly, FIGS. 1-2 hereafter are provided as general descriptions of a distributed data processing system and computing devices in which aspects of the illustrative embodiments may be implemented.

Figure 1:
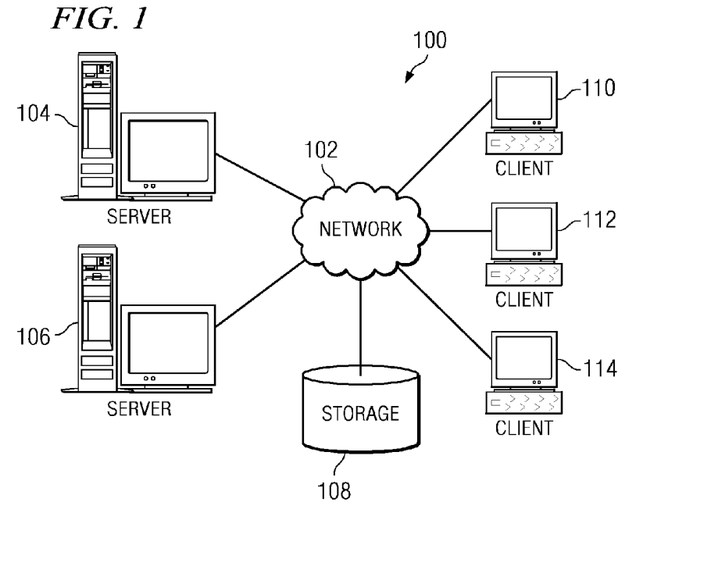
FIG. 1 is an exemplary representation of an exemplary distributed data processing system in which aspects of the illustrative embodiments may be implemented.
Figure 2:
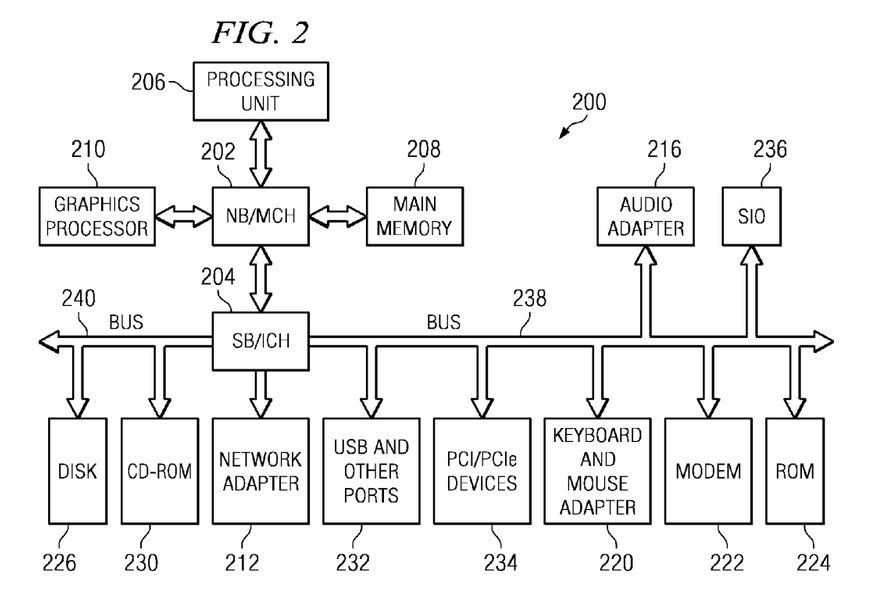
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 may be a storage area network (SAN). A SAN connects multiple servers, e.g., servers 104 and 106, with storage devices, such as storage unit 108, on a single data network. This data network typically uses Fibre Channel connections and block protocols, e.g., SCSI. Other possible implementations of a SAN may also use Ethernet or other communication protocols and interconnects. SANs allow sharing the storage infrastructure without implying data sharing. This allows higher utilization of storage devices and easier reconfiguration than is possible with direct attached storage. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, Host Bus Adapters (HBAs), and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Returning to FIG. 1, the distributed data processing system 10b0 may comprise a storage area network (SAN) in which the network 102 may be a SAN fabric having one or more SAN switches, directors, and/or the like. Client computing devices 110-114 and servers 104 and 106 may be host systems of the SAN with storage unit 108 actually constituting a storage subsystem of the SAN. One of the servers 104 or 106 may provide a management software suite for managing the SAN. This management software suite may comprise SAN topology management software, such as IBM TotalStorage Productivity Center™ (TPC), IBM SAN Volume Controller™ (SVC), and/or the like. In addition to the management software, the server 104 or 106 may further comprise an end-to-end systems management console, referred to herein as a hardware migration assistant, for facilitating the replacement of SAN components in accordance with the illustrative embodiments.

The illustrative embodiments provide a system and method for enabling storage area network (SAN) component migration for replacing SAN components. The illustrative embodiments provide the hardware migration assistant for simplifying the migration steps for a SAN administrator to replace key SAN components. The hardware migration assistant provides a single interface suitable for stepping the SAN administrator through the reconfiguring task faster and with fewer sources of error than the known distributed manual process.

The hardware migration assistant of the illustrative embodiments works in concert with the SAN topology management software. The SAN topology management software maintains information regarding the various SAN components of the SAN fabric and their configurations. For example, one SAN topology management software that may be used with the mechanisms of the illustrative embodiments is the TotalStorage Productivity Center™ (TPC) available from International Business Machines Corporation of Armonk, N.Y. TPC uses the storage industry standard, Storage Management Initiative Standard (SMI-S), to collect information from SAN and storage devices. The SMI-S standard has been developed by the Storage Network Industry Association (see www.snia.org). SMI-S defines a method for the interoperable management of a heterogeneous SAN. More information about SMI-S may be obtained from www.snia.org/tech_activities/standards/curr_standards/smi/. More information about TPC may be found at www.ibm.com. Thus, in one illustrative embodiment, using the mechanisms set forth in the SMI-S standard, or equivalent mechanisms, the SAN topology management software may obtain information about the various SAN components and storage subsystem components for use in configuring these components. This information may be made available to the hardware migration assistant of the illustrative embodiments for use in performing its functions.

The hardware migration assistant of the illustrative embodiments provides an interface through which a user may specify a type of SAN component that is being replaced and identifies the particular SAN components that are being replaced. The hardware migration assistant provides a knowledge base for guiding the user through the replacement operation and the reconfiguring of the SAN components, including the new SAN components, based on the previous configuration of the replaced components. In order to provide such guidance, a snapshot of the internal configuration of the replaced SAN component is obtained prior to replacement and used as a basis for determining a manner by which to configure the new SAN component. Based on the old configuration and the type of new SAN component being used to replace the old SAN component, the knowledge base provides the user with a detailed explanation of how to incorporate the new SAN component(s) in the existing SAN fabric such that the SAN does not "break."

The hardware migration assistant may run a probe on the new SAN component to detect its default or user defined configuration as well as determine the microcode level of the new SAN component. If the microcode level, e.g. firmware version, etc., is different from other similar SAN components in the SAN fabric, this may be flagged for prompting the user to correct the difference in microcode level. Alternatively, the hardware migration assistant may initiate an automated update of the microcode level to a required level to make it consistent with other existing SAN components in the SAN fabric, or automatic updating of the other existing SAN components in the SAN fabric to the microcode level of the new SAN component.

In addition, the hardware migration assistant may provide a side-by-side comparison of the old SAN component's configuration with the new SAN component's configuration in order to highlight differences. User interface elements may be provided for aiding the user in replicating the old configuration to the new SAN component for each configuration item individually.

Troubleshooting aids may also be provided through the hardware migration assistant of the illustrative embodiments. These troubleshooting aids may be general in nature and directed to particular problems that may typically be encountered with the replacement and configuring of the particular type of SAN component. Alternatively, mechanisms may be provided for verifying the new configuration of the new SAN component and determining specific errors associated with this new configuration. Troubleshooting aids for the detected configuration error may be automatically identified and then presented to the user to aid the user in correcting the configuration of the new SAN component based on the specific error encountered.

Figure 3:
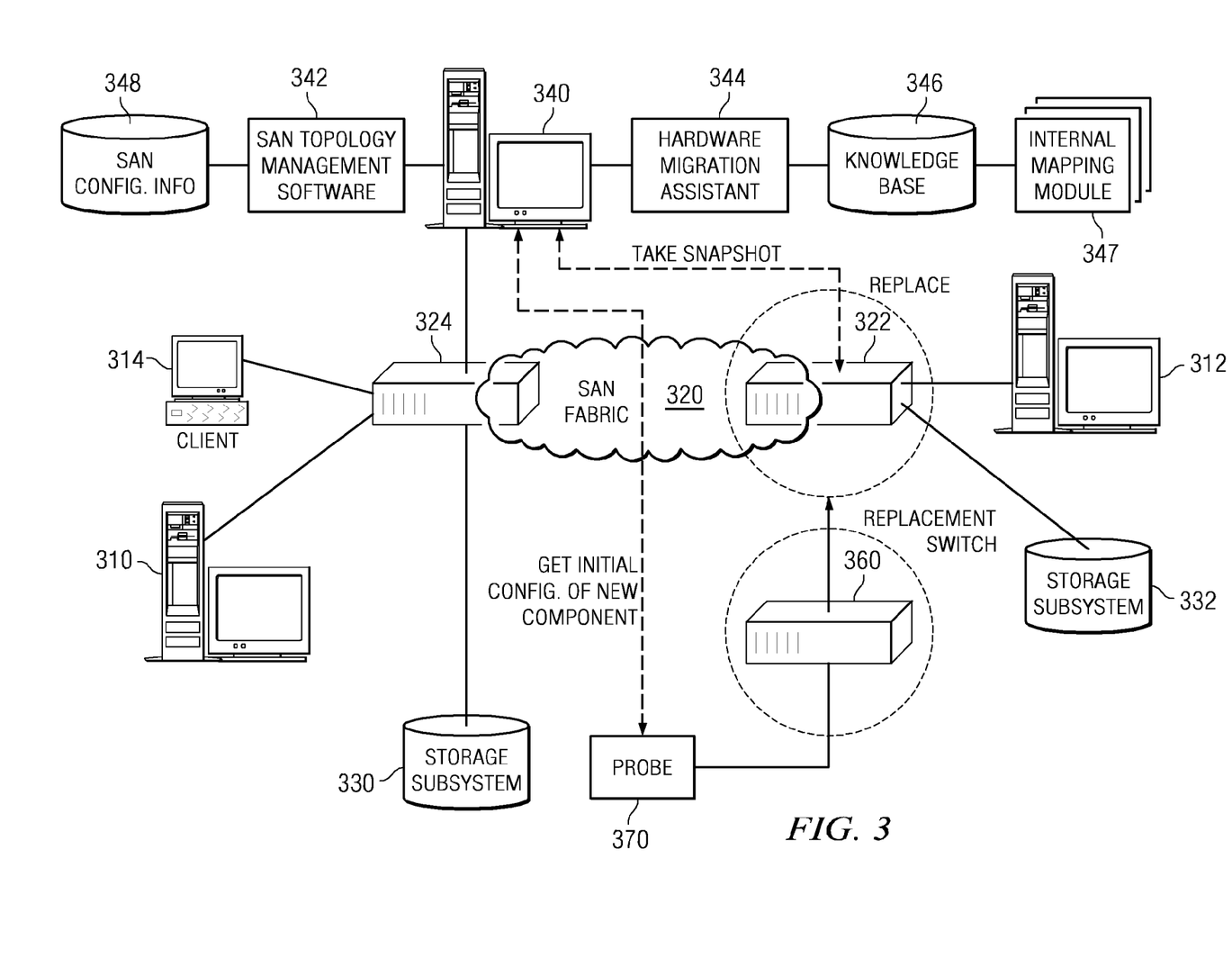
FIG. 3 is an exemplary diagram illustrating a replacement of a SAN component in accordance with one illustrative embodiment.

FIG. 3 is an exemplary diagram illustrating a replacement of a SAN component in accordance with one illustrative embodiment. As shown in FIG. 3, the SAN 300 comprises a plurality of host systems 310 and 312 coupled to the SAN fabric 320 which itself comprises switches 322 and 324. Also coupled to the SAN fabric 320 are storage subsystems 330 and 332. A SAN management system 340 having the SAN topology management software 342 and hardware migration assistant 344 of the illustrative embodiments is further coupled to the SAN fabric 320.

Often it is necessary to replace components of the SAN 300, such as a switch 322. The SAN topology management software 342 provides a mechanism through which a user may configure such components, but doing so is a time consuming process often requiring different personnel to configure different parts of the SAN 300 depending upon what components are being replaced. Moreover, such configuring often requires specialized and highly trained personnel having a detailed knowledge of the SAN fabric architecture. Because of the complex nature of the SAN 300 even experienced personnel may make mistakes during the configuring of replacement SAN components that cause the SAN 300, or at least a portion of the SAN 300, to not function properly.

The hardware migration assistant 344 provides an interface and knowledge base for guiding a user of a client computing device 314, who may not be a highly or specially trained SAN administrator, in performing the replacement and reconfiguring of the SAN fabric to utilize the new SAN components. When a user wishes to replace a SAN component in the SAN 300, the user may first log onto the hardware migration assistant 344 and specify the type of SAN component that is to be replaced, e.g., a switch, director, storage subsystem, or the like. Based on this type of SAN component that is being replaced, the hardware migration assistant 344 may provide a listing of the particular SAN components currently existing in the SAN fabric of that type. Moreover, the hardware migration assistant 344 may determine a set of rules from its knowledge base 346 to be applied to the replacement operation. The listing of existing SAN fabric components of the type specified by the user may be obtained by performing a search of the SAN configuration information 348 maintained by the SAN topology management software 342.

From the listing of SAN components existing in the SAN fabric, the user may specify which specific SAN components are being replaced, e.g., switch 322, such as by selecting the SAN component from the listing. Alternatively, the user may input a unique identifier of the SAN component being replaced, e.g., a World Wide Network Number (WWNN) and/or World Wide Port Number (WWPN). Moreover, similar information may be input for the new SAN component(s) that are being used to replace the old SAN component(s). Based on the identification of the old SAN component(s) that are being replaced, e.g., switch 322, the hardware migration assistant 344 may take a snapshot of the old SAN component(s) internal configuration, e.g., switch port status, which host systems, switches, storage subsystems, and the like, that are linked to the SAN component(s), current zoning maps for the SAN component(s), and the like. That is, the hardware migration assistant 344 may communicate with the SAN topology management software 342 to request that internal configuration information for the specific SAN component(s) be retrieved from the information maintained by the SAN topology management software 342.

The hardware migration assistant 344 retrieves the established rules from its knowledge base for replacing the specific old SAN component(s) with the specific new SAN component(s). From these rules, suggestions for physically configuring the new SAN component(s) 360 based on the specific old SAN component(s) being replaced are provided to the user via the hardware migration assistant 344. The user may also override these suggestions and use their own physical configuration for the new SAN component(s). One example of the way in which such suggestions may be provided is to provide a graphical representation of the old and new SAN component(s) with physical connections shown in each. A suggestion as to which connections in the old SAN component should be connected to new physical connection locations of the new SAN component may be provided in the graphical display, e.g., through an animation, graphical arrows showing the migration from the old SAN component to the new SAN component, or the like. For example, for a SAN switch, the old switch may be depicted with its corresponding ports and the new SAN switch with its corresponding ports. An animation showing the detaching of a cable from one port of the old SAN switch and reconnection of the cable to an appropriate port of the new SAN switch may be provided.

The actually operation of physically connecting the new SAN component(s) into the SAN fabric may be monitored and managed by the hardware migration assistant 344. For example, the hardware migration assistant 344 may provide a step-by-step guidance for physically incorporating the new SAN component(s) and may monitor the operation by the user to ensure that each step is performed correctly before moving on to the next step in the process. Such monitoring may be done in any manner suitable to the particular implementation, e.g., applying probe applications, "pinging" connections, interrogating the new SAN component(s) over the newly attached connection, or the like. Appropriate feedback may be provided to the user to further guide the user through the process of physically connecting the new SAN component(s) in the event of a failure or improper connection.

Once the new SAN component(s) 360 are physically incorporated into the SAN 300, a report of the new physical connections may be generated and provided to the user. This report may comprise, for example, a graphical representation of a comparison of the old and new SAN component(s) 360 with labeled ports, a wiring chart that lists each connection move, and/or the like. The user may then enter the necessary information into the hardware migration assistant 344 for the SAN topology management software 342 to discover the new SAN component(s) 360 or this information may be automatically generated by the hardware migration assistant 344 based on its monitoring of the physical incorporation of the SAN component(s) into the SAN fabric. This information may comprise, for example, the WWPN and/or WWNN of the new SAN component(s) 360.

The hardware migration assistant 344 may then run a probe 370 on the new SAN component(s) 360 to detect the initial configuration of the new SAN component(s) 360. The probe 370 is a software algorithm that interrogates the new SAN component(s) 360 to determine their current configuration, i.e. number of ports, port status, microcode level, etc. In one illustrative embodiment, the probe 370 may implement the SMI-S discussed above to collect configuration information from the new SAN component(s) 360 in a similar way that the SAN topology management software 342 obtains the configuration information for the existing SAN components. Alternatively, the probe 370 may implement vendor specific interfaces for collecting configuration information, especially for SAN components that have functionality and architectures that are not yet standardized.

The hardware migration assistant 344, having obtained the current configuration information for the new SAN component(s) 360, may determine if the microcode level is different from that of other SAN component(s) of the same type. If the microcode level, e.g., firmware version, or the like, is different from the microcode level of other SAN component(s) of the same type, then this difference may be flagged for alerting the user of the possible problem. Alternatively, the hardware migration assistant 344 may automatically cause a microcode update to be performed on the new SAN component(s) 360, or even the other existing SAN component(s), e.g., switch 324, of the same type if the new SAN component(s) 360 have the most recent version or highest level of microcode.

The hardware migration assistant 344 may then generate and provide a side-by-side comparison of the old SAN component(s) 322 configuration with the detected configuration of the new SAN component(s) 360. The old SAN component(s) 322 configuration may be obtained from the snapshot of the internal configuration taken by the hardware migration assistant 344. The new SAN component(s) 360 configuration may be obtained from the results of running the probe on the new SAN component(s) 360. The side-by-side comparison may show the relative port status, WWPN matches, port binding status, port speeds, which resources are connected to the ports, zonings, and the like. One or more user interface items may be provided for replicating the old configuration to the new SAN component(s) 360. In response to the user selecting one or more of these user interface items, old configuration information may be automatically mapped to corresponding configuration elements of the new SAN component(s) 360. In this way, the old configuration may be migrated to a new SAN component(s) 360.

As part of the configuration of the new SAN component(s), the hardware migration assistant 344 may monitor each step of the operation for compatibility. If it is known ahead of time, based on established rules, internal mapping modules, or the like, that a particular configuration from the old SAN component(s) cannot be migrated or replicated on the new SAN component(s) because of compatibility issues, the option to perform such a migration/replication may not be provided to the user via the side-by-side comparison interface or an alert, flag, or the like, may be generated in the interface to inform the user of the possible compatibility problem. Moreover, mechanisms may be provided for detecting compatibility problems and providing options to the user to back-out the changes made if the configuration change is unsuccessfully performed. This may be done in a step-by-step manner as changes to the configuration of the new SAN component(s) are performed such that a next step in the configuration process is not permitted to be performed until the previous step is determined to be completed successfully.

As an example, consider a user needing to replace an old SAN fabric switch 322 with a new switch 360. The user may first designate, via the hardware migration assistant 344, the type of SAN component that is being replaced, i.e. a SAN switch. A listing of the SAN switches 322-324 in the current SAN fabric 320 may be obtained from the SAN topology management software 342 based on the user's input to the hardware migration assistant 344 of the type of SAN component being replaced. From this listing of SAN switches, the user may select which switch, e.g., switch 322, is being replaced. Based on the user's selection, the hardware migration assistant 344 may take a snapshot of the current configuration of the selected SAN switch 322, e.g., the port status of the switch ports, which host systems, switches, storage subsystems, and the like that are linked to the switch, the current zone mapping for the switch, and the like.

The user may then provide information to the hardware migration assistant 344 indicating the new SAN switch 360 that is to be used to replace the old SAN switch 322, e.g., a unique identifier of the new SAN switch 360. Based on the snapshot of the old switch's configuration and an identification of the new SAN switch 360 to be used to replace the old SAN switch, the hardware migration assistant 344 provides guidance as to how the user may physically incorporate the new SAN switch 360 into the existing SAN fabric 320, i.e. suggested re-cabling of the new switch. The physical configuration suggestions may be obtained from a knowledge base 346 of the hardware migration assistant 344. That is, from the knowledge base 346 and the snapshot of the old SAN switch 322, it can be determined how to connect the various ports of the new SAN switch 360 so as to provide a similar physical connection to the other elements of the SAN, e.g., host systems, storage subsystems, and the like, as the old SAN switch 322.

Such physical configuration of the new SAN switch 360 may be simple if the new SAN switch 360 has a similar internal physical configuration as the old SAN switch 322, e.g., the old SAN switch has 32 ports and the new SAN switch also has 32 ports with similar internal architecture. The hardware migration assistant 344 may provide suggestions as to how to perform such physical configuration, e.g., cabling, in such cases in a relatively straightforward manner. However, the physical configuration of the new SAN switch 360 may be more complicated when the internal physical configurations are different, e.g., two 16 port switches are consolidated to a single 32 port switch or in the case where the user changes their cabling assignments (e.g., chooses to change port assignments of cables). In the more complex cases, the knowledge base 346 of the hardware migration assistant 344 may provide suggestions as to how to make the physical configuration of the new SAN switch 360 provide similar functionality as the old SAN switch(es) 322 with regard to linkages with other SAN components, redundancy, and the like. For example, in order to provide redundancy in the case of two 16 port switches being consolidated into a single 32 port switch that is internally separated into two functional units, it may be necessary to couple a host system to both port 1 and port 16 of the 32 port switch rather than ports 1 and 2 of the old switch. Such determinations may be made by the hardware migration assistant 344 based on the snapshot of the old SAN switch 322 configuration and the information maintained by the hardware migration assistant 344 or otherwise provided to the hardware migration assistant 344 by the user for the new SAN switch 360.

Based on the suggestions from the hardware migration assistant 344, the new SAN switch 360 may be integrated into the SAN fabric 320 by replacing the old SAN switch 322. Of course, the suggestions provided by the hardware migration assistant 344 are only suggestions and the user may choose to override the suggested physical configuration. The user may then enter the information for the new SAN switch 360 into the hardware migration assistant 344 so that the SAN topology management system 342 may discover the new SAN switch 360. The hardware migration assistant 344 then runs a probe application 370 on the new SAN switch 360 to detect the new SAN switch's initial configuration, including the microcode level of the new SAN switch 360. The hardware migration assistant 344 may then compare the microcode level of the new SAN switch 360 with the microcode level of other SAN switches 324 in the SAN fabric 320. If there are differences, these differences may be flagged for later presentation to the user as possible error sources. Moreover, automated resolution of the differences, such as by performing a firmware update or the like, may be initiated.

The hardware migration assistant 344 may then present a side-by-side comparison of the old SAN switch's configuration (obtained from the snapshot) to the new SAN switch's configuration (obtained from the probe 370). Some important configuration elements that may be displayed in this side-by-side comparison include port status, WWPN matches, port binding status, port speed, which resources are connected, zoning information, and the like. Any differences between the old configuration and the new configuration may be highlighted in this side-by-side comparison. User interface items may be provided in the side-by-side comparison, or via another user interface, for allowing the user to specify which elements he/she would like the old SAN switch configuration automatically migrated to the new SAN switch 360.

Once configured, the SAN switch configuration is provided to the SAN topology management software 342 which may determine if the configuration conflicts with other SAN components or otherwise is incorrect in some manner. Such conflicts or errors in configuration may be returned from the SAN topology management software 342 to the hardware migration assistant 344 which may then provide troubleshooting aids for assisting the user in correcting such conflicts or errors in configuration. Alternatively, or in addition, more general troubleshooting aids may be provided that are not necessarily presented based on a detected conflict or error.

This same general series of operations may be performed for various types of SAN components including switches, host bus adapters (HBAs), storage subsystems, and the like. However, depending upon the type of SAN component being replaced, some differences in the operations may exist. For example, if a HBA is being replaced in a SAN, after taking a snapshot of the old HBA configuration the HBA may be manually replaced using or overriding the replacement suggestions of the hardware migration assistant 344. The probe 370 may then be run on the host system associated with the HBA to get the new WWPN(s) for the new HBA. Alternatively, the user may enter the new WWPN(s) into the hardware migration assistant 344 or they may be pulled from the switch with which the new HBA is associated. The microcode level of the HBA may be verified and determined whether it is different from other HBAs in the SAN fabric.

A side-by-side comparison of the old and new configurations may be provided and user interface items for replicating the old configuration to the new HBA may also be provided. The side-by-side comparison may show, for example, the volumes visible to the HBA, switches connected to the HBA, connection speed, host multi-path settings, and the like. The user interface items may provide mechanisms for reconfiguring switch port bindings and storage subsystem Logical Unit Number (LUN) masking with the new HBA based on the new HBA's WWPN(s).

As another example, when replacing/migrating a storage subsystem of the SAN, e.g., storage subsystem 330, the user specifies the type of storage subsystem that is being replaced, identifies which specific storage subsystem that is to be replaced, and then selects which storage volumes to migrate. A snapshot of the existing storage subsystem configuration, logical configuration, LUN masking, and host system information is obtained.

The hardware migration assistant 344 may then configure the new storage subsystem if it is of a type known to the hardware migration assistant 344. That is, the knowledge base 346 of the hardware migration assistant 344 may comprise internal mapping modules 347 for each known storage subsystem type. The internal mapping modules 347 may comprise logic for automatically configuring host systems, performing LUN masking, and performing other logical configuration operations in order to make the new storage subsystem operable within the SAN fabric. These internal mapping modules 347 provide a layer of abstraction that allows a set of configuration rules specified in the hardware migration assistant 344 to be abstracted between storage subsystems. That is, a single set of configuration rules for storage subsystems may be provided in the logic of the hardware migration assistant 344 and these configuration rules may be expanded by the internal mapping modules 347 to be applicable to the specific type of storage subsystems that are the subject of the replacement operation. Similar internal mapping modules 347 may be provided for other types of SAN components with a general set of configuration rules for each type of SAN component being provided in the hardware migration assistant 344 that can be expanded upon by the internal mapping modules.

If the SAN supports data replication, such as through use of a replication mechanism like peer-to-peer remote copy (PPRC) or the like, replication sessions are created for migrating data form the old storage subsystem's selected volumes to the new storage subsystem. In some illustrative embodiments, if such replication is not supported, it is possible to obtain a temporary license of this functionality to perform the data migration in response to the specific storage subsystem replacement. Alternatively, the user may migrate the data from the old storage subsystem to the new storage subsystem on their own at a desired time, such as during a maintenance window or the like.

As with the other SAN components, the user may enter the information for discovery of the new storage subsystem and volumes. The hardware migration assistant 344 may run a probe on the new storage subsystem to collect physical and logical configuration information. The hardware migration assistant 344 may then display a side-by-side comparison of the old storage subsystem volumes and the new storage subsystem volumes. Important information that may be presented in such a side-by-side comparison includes volume capacity, LUN masking and mapping, and zoning information. User interface items may be provided to allow the user to replicate the old storage subsystem configuration to the new storage subsystem, e.g., mapping the target volume to the host system and adding the target storage subsystem ports to existing zones.

Thus, the illustrative embodiments provide a mechanism through which SAN components may be easily replaced and configurations of SAN components may be migrated to ensure proper operation of the SAN fabric. The mechanisms of the illustrative embodiments reduce the amount of specialized information necessary to perform such replacement and migration operations by providing a knowledge base to provide user guidance for replacing and configuring SAN components, automatic detection of old and new SAN component configurations, and automatic migration of configuration information from old SAN components to new SAN components. This greatly reduces the complexity of performing replacement and migration operations within complex SAN architectures.

Figure 4:
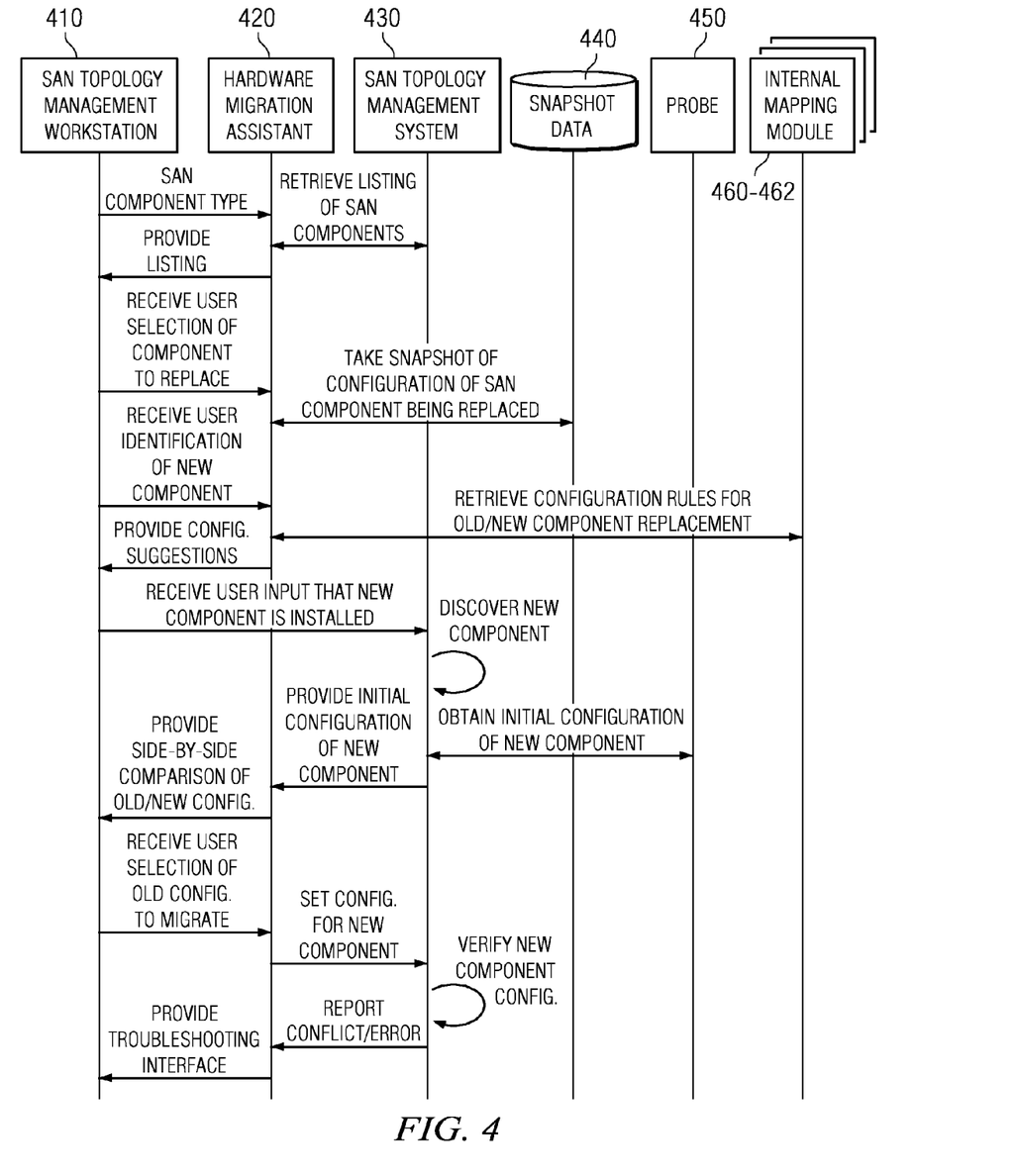
FIG. 4 is an exemplary diagram illustrating an exemplary operation for replacement of a SAN component and reconfiguring the SAN component using a hardware migration assistant in accordance with one illustrative embodiment.

FIG. 4 is an exemplary diagram illustrating an exemplary operation for replacement of a SAN component and reconfiguring the SAN component using a hardware migration assistant in accordance with one illustrative embodiment. As shown in FIG. 4, the user may initiate a SAN component replacement operation by providing an input, via their SAN topology management workstation 410, of an indication of the type of SAN component that is to be replaced. The hardware migration assistant 420 may then communicate with a SAN topology management system 430 to identify the specific SAN components of the SAN that are of the type input by the user. The hardware migration assistant 420 may then present a listing of the SAN components of the specified type to the user via the SAN topology management workstation 410. The user may then select a specific SAN component from the list or otherwise enter an identification of the specific SAN component that is to be replaced.

The hardware migration assistant 420 may perform a snapshot of the current configuration of the identified specific SAN component that is to be replaced. The hardware migration assistant 420 may perform the snapshot operation by copying the configuration information for the SAN component from the configuration information 435 maintained by the SAN topology management system 430 to generate the snapshot data structure 440. The user may then enter the information for the new SAN component via the SAN topology management workstation 410 and the hardware migration assistant 420 may retrieve the appropriate configuration rules for performing the physical and/or logical configuration of the new SAN component based on the old configuration of the old SAN component. These configuration rules may comprise, for example, generalized configuration rules for the particular type of SAN component being replaced as well as specific configuration rules for the specific SAN components involved in the replacement, as might be specified in one or more internal mapping modules 460-462 or the like.

The hardware migration assistant 420 may then provide suggestions to the user via the SAN topology management workstation 410 for performing the initial configuration of the new SAN component so that it may be incorporated into the SAN fabric. The user may then physically connect the new SAN component to the SAN fabric, either in addition to the old SAN component or in replacement of the old SAN component. Upon physically connecting the new SAN component to the SAN fabric, the new SAN component has an initial logical configuration that may be modified to achieve a desired functionality within the SAN fabric.

Having incorporated the new SAN component into the SAN fabric, the SAN topology management system 430 may discover the new SAN component and the hardware migration assistant 420 may run a probe 450 on the new SAN component to obtain its initial configuration information. The hardware migration assistant 420 may then return a side-by-side comparison to the user via the SAN topology management workstation 410. The side-by-side comparison may include highlighting of differences in configuration between the old SAN component configuration and the new SAN component configuration, including differences in microcode level and the like. Moreover, the side-by-side comparison may further include user interface items for automatically replicating the old SAN component configuration to the new SAN component for individual configuration elements. Moreover, a user interface item may be provided for setting the configuration of the new SAN component for use by the SAN topology management system 430.

The SAN topology management system 430, based on the set configuration of the new SAN component, may determine if there are any inconsistencies or errors between the new SAN component and other SAN components in the SAN fabric. These detected inconsistencies or errors may be reported back to the hardware migration assistant 420 for use in providing troubleshooting aids to the user via the SAN topology management workstation 410. Based on these troubleshooting aids, the user may revise the configuration of the new SAN component and reset the new SAN component configuration.

Figure 5A:
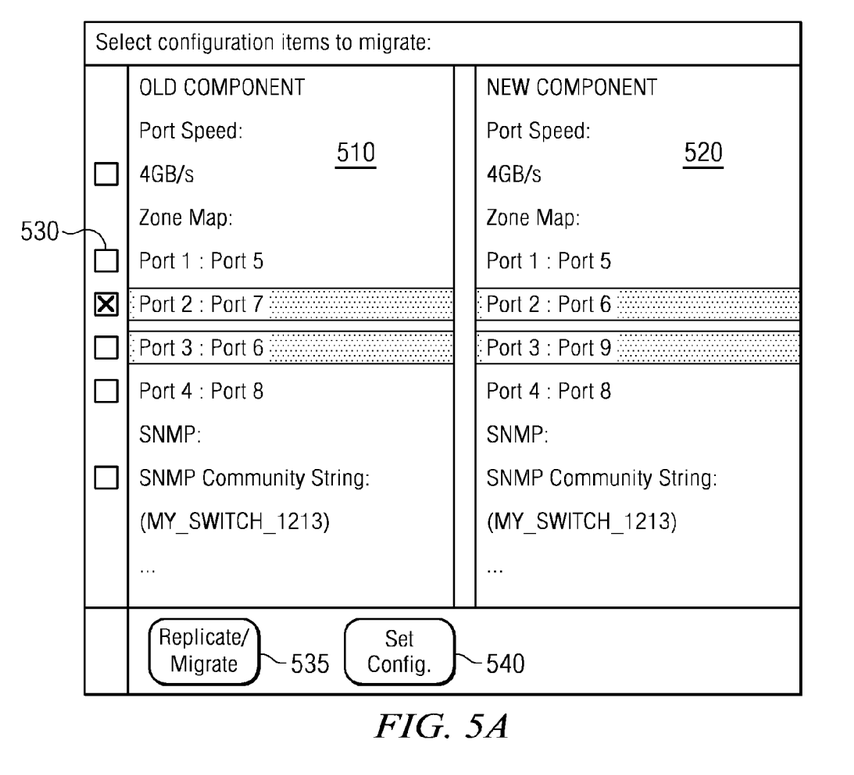
FIG. 5A is an exemplary diagram illustrating a side-by-side comparison of an old SAN component configuration with a new SAN component configuration in accordance with one illustrative embodiment.

FIG. 5A is an exemplary diagram illustrating a side-by-side comparison of an old SAN component configuration with a new SAN component configuration in accordance with one illustrative embodiment. FIG. 5A is only intended to be exemplary and is not limiting with regard to the way in which a side-by-side comparison of components may be presented or the particular types of information that may be provided using such a side-by-side comparison. Many modifications to the side-by-side comparison shown in FIG. 5A may be made without departing from the spirit and scope of the present invention.

The example side-by-side comparison shown in FIG. 5A is for the replacement of a SAN switch, although similar comparisons may be provided for different SAN components. As shown in FIG. 5A, the side-by-side comparison comprises a first portion 510 having the configuration elements for the old switch and a second portion 520 having the configuration elements for the new switch. Examples of configuration elements that may be included in these portions include the port speed of the switch, zone mappings, SNMP settings, and the like. Configuration elements that are different between the first portion 510 and the second portion 520 may be highlighted, such as by different shading, different fonts, colors, or any other known way of highlighting a portion of a display.

User interface items 530-540 may be provided for selecting which configuration elements to have the old configuration setting replicated to the new component. For example, a user may select individual ones of check boxes 530 for the configuration elements that the user wishes the old configuration to be replicated to the new SAN component. The user may then select the replicate user item 535 to replicate the old configuration to the new SAN component for the selected configuration elements. The user may then select the set configuration user interface item 540 to set the configuration for the new SAN component.

Figure 5B:
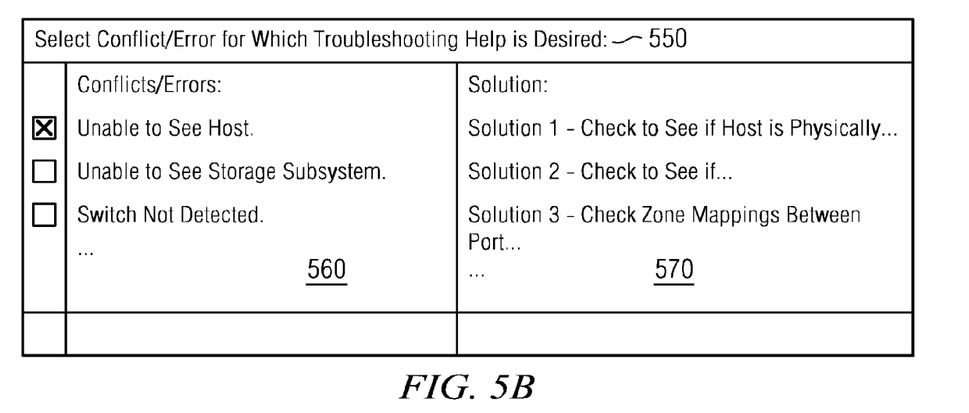
FIG. 5B is an exemplary diagram of a troubleshooting interface that may be provided in accordance with one illustrative embodiment.

FIG. 5B is an exemplary diagram of a troubleshooting interface that may be provided in accordance with one illustrative embodiment. The troubleshooting interface 550 of FIG. 5B may be provided as a means for providing general troubleshooting information or may be provided in response to specific conflicts or errors detected in the configuration of a new SAN component. As shown in FIG. 5B, the troubleshooting interface includes a listing of conflicts or errors 560 which are associated with corresponding solutions 570. The solutions 570 preferably provide user instructions for guiding the user in resolving the associated conflict or error in physical and/or logical configuration of the new SAN component.

Figure 6:
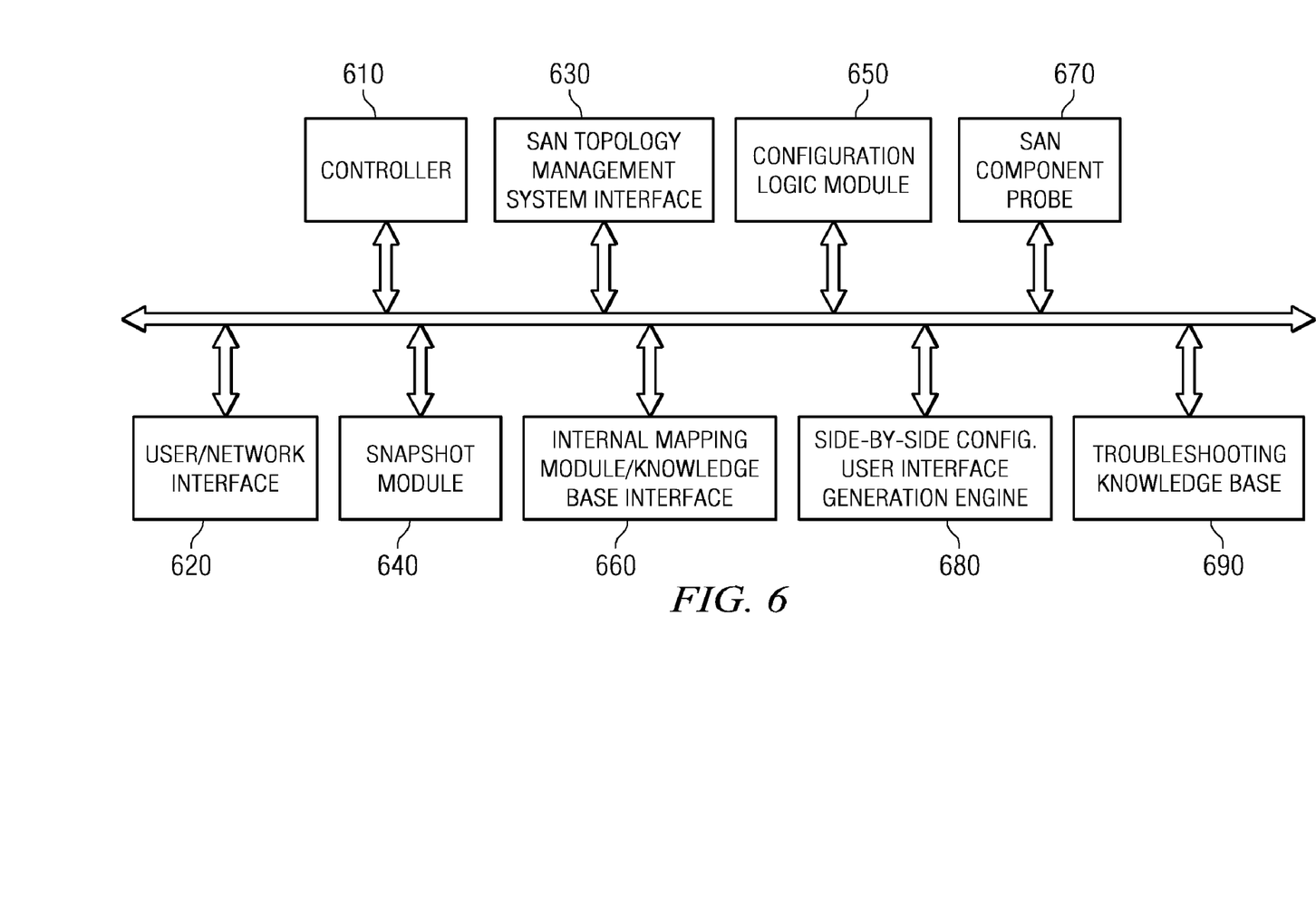
FIG. 6 is an exemplary block diagram of a hardware migration assistant in accordance with one illustrative embodiment.

FIG. 6 is an exemplary block diagram of hardware migration assistant in accordance with one illustrative embodiment. As shown in FIG. 6, the hardware migration assistant comprises a controller 610, a user/network interface 620, a SAN topology management system interface 630, a snapshot module 640, a configuration logic module 650, an internal mapping module/knowledge database interface 660, a SAN component probe 670, a side-by-side configuration user interface generation engine 680, and a troubleshooting knowledge base 690. The elements 610-690 of the hardware migration assistant may be implemented in hardware, software, or any combination of hardware and software. In one illustrative embodiment, the elements 610-690 are implemented as software instructions executed by one or more data processing devices.

The controller 610 controls the overall operation of the hardware migration assistant and orchestrates the operation of the other elements 620-690. The user/network interface 620 provides a communication interface through which a user may input user selections and information for performing a SAN component replacement operation and configuration operation. In addition, the user/network interface 620 provides a communication interface through which the user may be provided with user interfaces from the hardware migration assistant, such as the side-by-side comparison user interface, troubleshooting interface, and the like. The SAN topology management system interface 630 provides a communication interface through which the hardware migration assistant may communicate with the SAN topology management system to obtain current configuration information about old SAN components, perform discovery of new SAN components and their initial configurations, set new configurations for the new SAN components, obtain conflict and error information, and the like.

The snapshot module 640 provides the functionality for obtaining a snapshot of the current configuration of a SAN component. The snapshot module 640 may work with the SAN topology management system via the interface 630 to obtain the current configuration of a SAN component that is to be replaced. Moreover, the snapshot module 640 may work in concert with that SAN component probe 670 discussed hereafter to actually probe the SAN component for its current internal configuration settings.

The configuration logic module 650 provides the general configuration logic for various types of SAN components. This configuration logic is expanded upon for specific types of SAN components by the internal mapping modules/knowledge base accessible via the internal mapping modules/knowledge base interface 660. These internal mapping modules and/or knowledge base provide additional configuration rules for configuring the specific SAN components. These additional configuration rules may operate in concert with, or in replacement of, the general configuration logic provided by the configuration logic module 650.

The SAN component probe 670 provides a mechanism for extracting the current configuration settings of a SAN component. As discussed above, the SAN component probe 670 may be applied to a new SAN component after discovery of the SAN component by the SAN topology management system to obtain the new SAN component's initial configuration settings. This information may be used along with the snapshot information obtained by the snapshot module 640 to present a side-by-side comparison of the configuration of an old SAN component with that of a new SAN component, as described above.

The side-by-side configuration user interface generation engine 680 provides the functionality for generating a side-by-side comparison of the old SAN component with the new SAN component, as discussed at length above. The engine 680 may further provide the user interface items for controlling the replication of old configuration items to the new SAN component configuration and for setting the new SAN component configuration. The engine 680 further provides highlighting of different settings of configuration elements, highlighting of differences in microcode level, and the like. The controller 610 may initiate an automated update of microcode if desired as discussed above, when there is a detected difference in microcode level of the new SAN component with other similar SAN components in the SAN fabric.

The troubleshooting knowledge base 690 provides help information for aiding a user in resolving conflicts or errors in configuration of a new SAN component. The information may be keyed to specific types of problems that may be encountered, e.g., unable to see host system, unable to see storage subsystem, conflict in zoning, etc. The troubleshooting knowledge base 690 may be used by the controller 610 to provide a general troubleshooting interface for the user to utilize or it may provide a specific troubleshooting interface based on detected conflicts or errors as reported back from the SAN topology management system via the interface 630.

Figure 7:
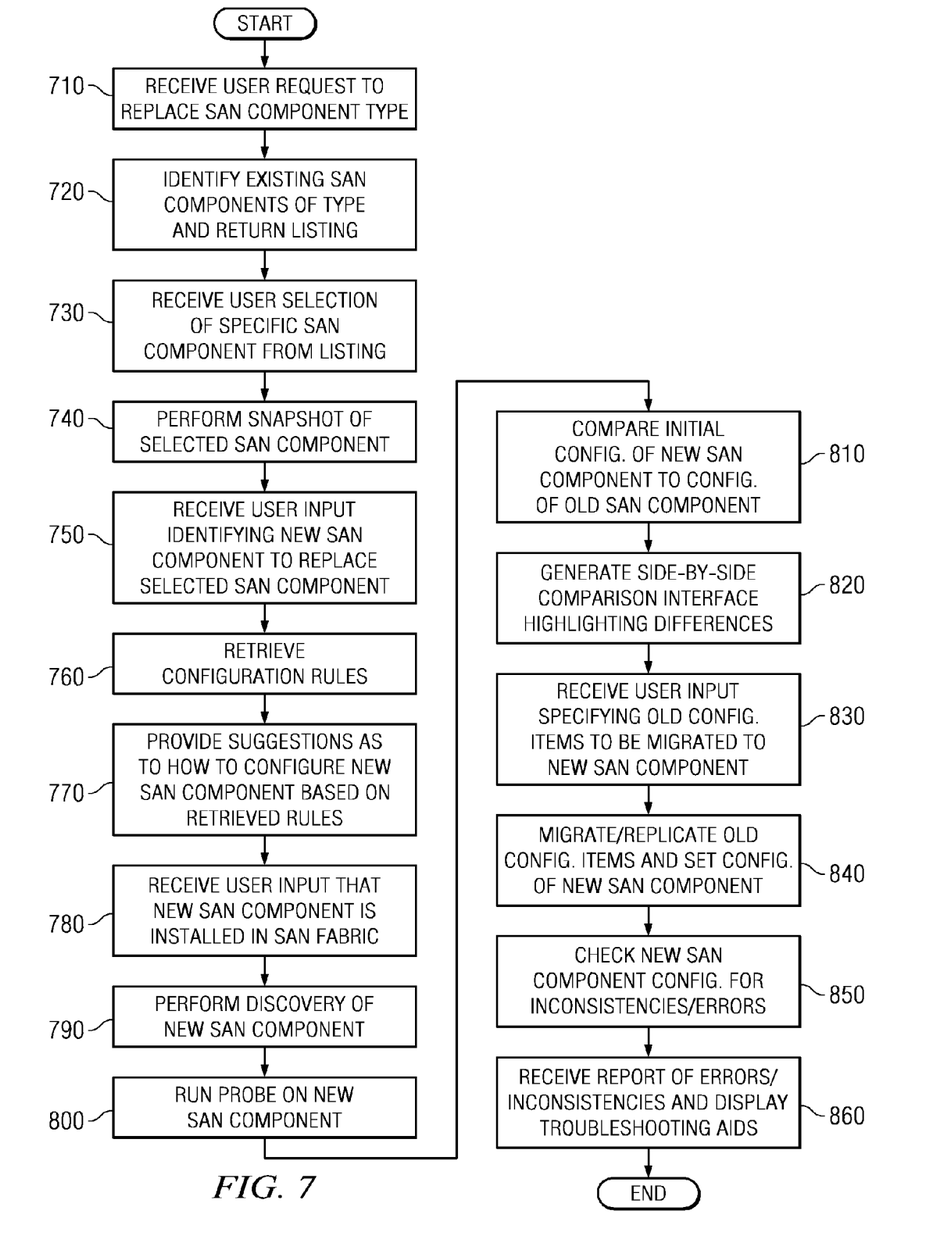
FIG. 7 is a flowchart outlining an exemplary operation for replacing a SAN component and configuring the new SAN component in accordance with one illustrative embodiment.

FIG. 7 is a flowchart outlining an exemplary operation for replacing a SAN component and configuring the new SAN component in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIG. 7, the operation starts with receiving a user request from a user workstation to replace a particular SAN component type (step 710). Currently existing SAN components in the SAN fabric having the same type as that specified by the user are identified and a listing of these SAN components is returned to the user workstation (step 720). A user selection of a specific SAN component from the listing of SAN components is received (step 730) and a snapshot of the current configuration information for the selected SAN component is performed (step 740).

A user input of the identification of a new SAN component to replace the selected SAN component is received (step 750). Configuration rules for configuring the new SAN component based on the configuration of the old SAN component are retrieved (step 760). Suggestions as to how to configure the new SAN component are output to the user (step 770). An indication that the new SAN component has been integrated into the SAN fabric is received from the user workstation (step 780).

The new SAN component is discovered (step 790) and a probe is run on the new SAN component to obtain its initial configuration (step 800). The initial configuration of the new SAN component is compared to the old configuration of the old SAN component obtained from the snapshot (step 810). A side-by-side comparison of the two configurations with differences highlighted is presented to the user (step 820). User input of configuration elements that are to have the old configuration replicated to the new SAN component is received (step 830). The old configuration is replicated to the new SAN component and the new SAN component's configuration is set within the SAN fabric (step 840).

The new SAN component's configuration is checked for inconsistencies and errors (step 850). Inconsistencies and errors are reported back to the user along with troubleshooting help items for aiding the user in correcting the configuration of the new SAN component (step 860). The operation then terminates.

Thus, the illustrative embodiments provide mechanisms for aiding a user in performing modifications to a SAN topology, such as by replacing SAN components. The mechanisms of the illustrative embodiments provide a user with guidance as to how to physically and logically configure a new SAN component in the SAN fabric based on a previous configuration of an old SAN component that is being replaced. Moreover, user interfaces are provided for allowing a user to easily migrate/replicate an old configuration of an old SAN component to a new SAN component. All of these mechanisms make for a more user friendly mechanisms for simplifying the SAN component replacement/migration operation over known complicated manual processes utilizing separate highly trained personnel.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored thereon, wherein the computer readable program, when executed on a computing device, causes the computing device to:
perform a snapshot of a current configuration of an old storage area network (SAN) component that is to be replaced;
retrieve configuration rules for configuring a new SAN component for replacement of the old SAN component based on an identification of the old SAN component and the new SAN component;
present, via a graphical display, guidance to a user for replacing the old SAN component with the new SAN component based on the retrieved configuration roles;
obtain an initial configuration of the new SAN component, wherein the initial configuration of the new SAN component is different from the current configuration of the old SAN component;
present, via the graphical display, a comparison of the snapshot of the current configuration of the old SAN component with the initial configuration of the new SAN component to the user, wherein the comparison identifies a set of differences in configuration between the current configuration of the old SAN component and the initial configuration of the new SAN component;
receive from the user a user selection of at least one configuration item in the set of differences in configuration to be replicated from the old SAN component to the new SAN component; and
re-configure the new SAN component with the at least one configuration item in response to the user selection of the at least one configuration item in the set of differences in configuration to replicate to the new SAN component.

2. The computer program product of claim 1, wherein the computer readable program further causes the computing device to:
receive a replacement request indentifying a SAN component type for a SAN component that is to be replaced;
identify one or more existing SAN components in a SAN topology having a type matching the SAN component type in the replacement request;
present, via the graphical display, a listing of the one or more existing SAN components in the SAN topology to the user; and
receive a user selection of the old SAN component from the presented listing.

3. The computer program product of claim 1, wherein the computer readable program causes the computing device to obtain an initial configuration of the new SAN component by running a probe on the new SAN component following discovery of the new SAN component within a SAN topology.

4. The computer program product of claim 1, wherein the comparison is a side-by-side interface representing the old SAN component in a first portion of the side-by-side interface and representing the new SAN component in a second portion of the side-by-side interface.

5. The computer program product of claim 4, wherein the set of differences in configuration of the old SAN component and configuration of the new SAN component are accentuated in the first portion and second portion of the side-by-side interface.

6. The computer program product of claim 4, wherein the computer readable program further causes the computing device to:
provide one or more user interface items within the side-by-side interface for migrating one or more configuration items from the configuration of the old SAN component to the configuration of the new SAN component.

7. The computer program product of claim 1, wherein the computer readable program further causes the computing device to:
verify a new configuration of the re-configured new SAN component; and
provide a troubleshooting aid to the user in response to a determination that at least one configuration item in the new configuration is not verified.

8. The computer program product of claim 1, wherein the computer readable program causes the computing device to retrieve configuration rules for configuring a new SAN component for replacement of the old SAN component based on an identification of the old SAN component and the new SAN component by:
identifying at least one general configuration rule for configuring the new SAN component for replacement of the old SAN component;
identifying at least one internal mapping module having specific configuration rules for at least one of the new SAN component or the old SAN component; and
applying the at least one general configuration rule and the specific configuration rules of the at least one internal mapping module to the new SAN component.

9. The computer program product of claim 1, wherein the computer readable program comprises instructions that are stored in a computer readable storage medium in a data processing system, and wherein the instructions were downloaded over a network from a remote data processing system.

10. The computer program product of claim 1, wherein the computer readable program comprises instructions that are stored in a computer readable storage medium in a server data processing system, and wherein the instructions are downloaded over a network to a remote data processing system for use in a computer readable storage medium with the remote data processing system.

11. A method, in a data processing system, for providing a hardware migration service for replacing a storage area network (SAN) component, comprising:
performing a snapshot of a current configuration of an old SAN component that is to be replaced;
retrieving configuration rules for configuring a new SAN component for replacement of the old SAN component based on an identification of the old SAN component and the new SAN component;
presenting, via a graphical display, guidance to a user for replacing the old SAN component with the new SAN component based on the retrieved configuration rules;
obtaining an initial configuration of the new SAN component, wherein the initial configuration of the new SAN component is different from the current configuration of the old SAN component;
presenting, via the graphical display, a comparison of the snapshot of the current configuration of the old SAN component with the initial configuration of the new SAN component to the user, wherein the comparison identifies a set of differences in configuration between the current configuration of the old SAN component and the initial configuration of the new SAN component;
receiving from the user a user selection of at least one configuration item in the set of differences in configuration to be replicated from the old SAN component to the new SAN component; and
re-configuring the new SAN component with the at least one configuration item in response to the user selection of the at least one configuration item in the set of differences in configuration to replicate to the new SAN component.

12. The method of claim 11, further comprising:
receiving a replacement request indentifying a SAN component type for a SAN component that is to be replaced;
identifying one or more existing SAN components in a SAN topology having a type matching the SAN component type in the replacement request;
presenting, via the graphical display, a listing of the one or more existing SAN components in the SAN topology to the user; and
receiving a user selection of the old SAN component from the presented listing.

13. The method of claim 11, wherein obtaining an initial configuration of the new SAN component comprises running a probe on the new SAN component following discovery of the new SAN component within a SAN topology.

14. The method of claim 11, wherein the comparison is a side-by-side interface representing the old SAN component in a first portion of the side-by-side. interface and representing the new SAN component in a second portion of the side-by-side interface.

15. The method of claim 14, wherein the set of differences in configuration of the old SAN component and configuration of the new SAN component are accentuated in the first portion and second portion of the side-by-side interface.

16. The method of claim 14, further comprising:
providing one or more user interface items within the side-by-side interface for migrating one or more configuration items from the configuration of the old SAN component to the configuration of the new SAN component.

17. The method of claim 11, further comprising:
verifying a new configuration of the re-configured new SAN component; and
providing a troubleshooting aid to the user in response to a determination that at least one configuration item in the new configuration is not verified.

18. The method of claim 11, wherein retrieving configuration rules for configuring a new SAN component for replacement of the old SAN component based on an identification of the old SAN component and the new SAN component comprises:
identifying at least one general configuration rule for configuring the new SAN component for replacement of the old SAN component;
identifying at least one internal mapping module having specific configuration rules for at least one of the new SAN component or the old SAN component; and applying the at least one general configuration rule and the specific configuration rules of the at least one internal mapping module to the new SAN component.

19. A system for providing a hardware migration service for replacing a storage area network (SAN) component, comprising:

at least one processor; and a memory coupled to the at least one processor, the memory comprising instructions which, when executed by the at least one processor, cause the processor to:

perform a snapshot of a current configuration of an old SAN component that is to be replaced;

retrieve configuration rules for configuring a new SAN component for replacement of the old SAN component based on an identification of the old SAN component and the new SAN component;

present, via a graphical display, guidance to a user for replacing the old SAN component with the new SAN component based on the retrieved configuration rules;

obtain an initial configuration of the new SAN component, wherein the initial configuration of the new SAN component is different from the current configuration of the old SAN component;

present, via the graphical display a comparison of the snapshot of the current configuration of the old SAN component with the initial configuration of the new SAN component to the user, wherein the comparison identifies a set of differences in configuration between the current configuration of the old SAN component and the initial configuration of the new SAN component;

receive from the user a user selection of at least one configuration item in the set of differences in configuration to be replicated from the old SAN component to the new SAN component; and re-configure the new SAN component with the at least one configuration item in response to the user selection of the at least one configuration item in the set of differences in configuration to replicate to the new SAN component.

20. The system of claim 19, wherein the instructions further cause the at least one processor to:

receive a replacement request indentifying a SAN component type for a SAN component that is to be replaced;

identity one or more existing SAN components in a SAN topology having a type matching the SAN component type in the replacement request;

present, via the graphical display, a listing of the one or more existing SAN components in the SAN topology to the user; and receive a user selection of the old SAN component from the presented listing.

21. The system of claim 19, wherein:

the comparison is a side-by-side interface representing the old SAN component in a first portion of the side-by-side interface and representing the new SAN component in a second portion of the side-by-side interface, and the set of differences in configuration of the old SAN component and configuration of the new SAN component are accentuated in the first portion and second portion of the side-by-side interface.

22. The system of claim 21, wherein the instructions further cause the at least one processor to:

provide one or more user interface items within the side-by-side interface for migrating one or more configuration items from the configuration of the old SAN component to the configuration of the new SAN component.

23. The system of claim 19, wherein the instructions cause the at least one processor to retrieve configuration rules for configuring a new SAN component for replacement of the old SAN component based on an identification of the old SAN component and the new SAN component by:

identifying at least one general configuration rule for configuring the new SAN component for replacement of the old SAN component;

identifying at least one internal mapping module having specific configuration rules for at least one of the new SAN component or the old SAN component; and applying the at least one general configuration rule and the specific configuration rules of the at least one internal mapping module to the new SAN component.

* * * * *